United States Patent [19]

Trimble

[11] Patent Number: 4,483,057
[45] Date of Patent: Nov. 20, 1984

[54] STUFFING BOX REMOVAL APPARATUS

[76] Inventor: Eldridge Trimble, Rte. 1, Box 1017, St. Martinville, La. 70582

[21] Appl. No.: 335,826

[22] Filed: Dec. 30, 1981

[51] Int. Cl.$^3$ ............................................. B23P 19/04
[52] U.S. Cl. ..................................................... 29/252
[58] Field of Search ................. 29/252, 251, 244, 263, 29/264, 214, 234

[56] References Cited

U.S. PATENT DOCUMENTS

| | | | |
|---|---|---|---|
| 2,430,201 | 11/1947 | Wyscaver | 29/252 |
| 2,715,261 | 8/1955 | Williams | 29/252 |
| 2,856,677 | 10/1958 | Rekettye | 29/252 |
| 3,087,236 | 4/1963 | Paytas | 29/244 |
| 3,217,394 | 11/1965 | Castoe | 29/252 |
| 3,359,618 | 12/1967 | Murphy | 29/252 |
| 3,390,446 | 7/1968 | Ettorre | 29/252 |

Primary Examiner—Robert C. Watson
Attorney, Agent, or Firm—Keaty & Keaty

[57] ABSTRACT

An apparatus for removing the stuffing box in a down hole mud pump, which includes a substantially elongated mounting frame having at least a pair of retainer rings in spaced relation from and coaxially mounted in relation to a threaded collar member, with the rings in the collar member being held in spaced relation by a pair of guide bars. There is further provided a rear mounting portion having a pair of mounting plates defining a retaining space there between. There would be further provided an elongated ram member insertible into the guide, and having slidable movement there within. There is further provided a hydraulic jack or the like which would be mounted in the retainer space, so that outward movement of the jack piston would impart lateral movement to the ram of the apparatus.

4 Claims, 5 Drawing Figures

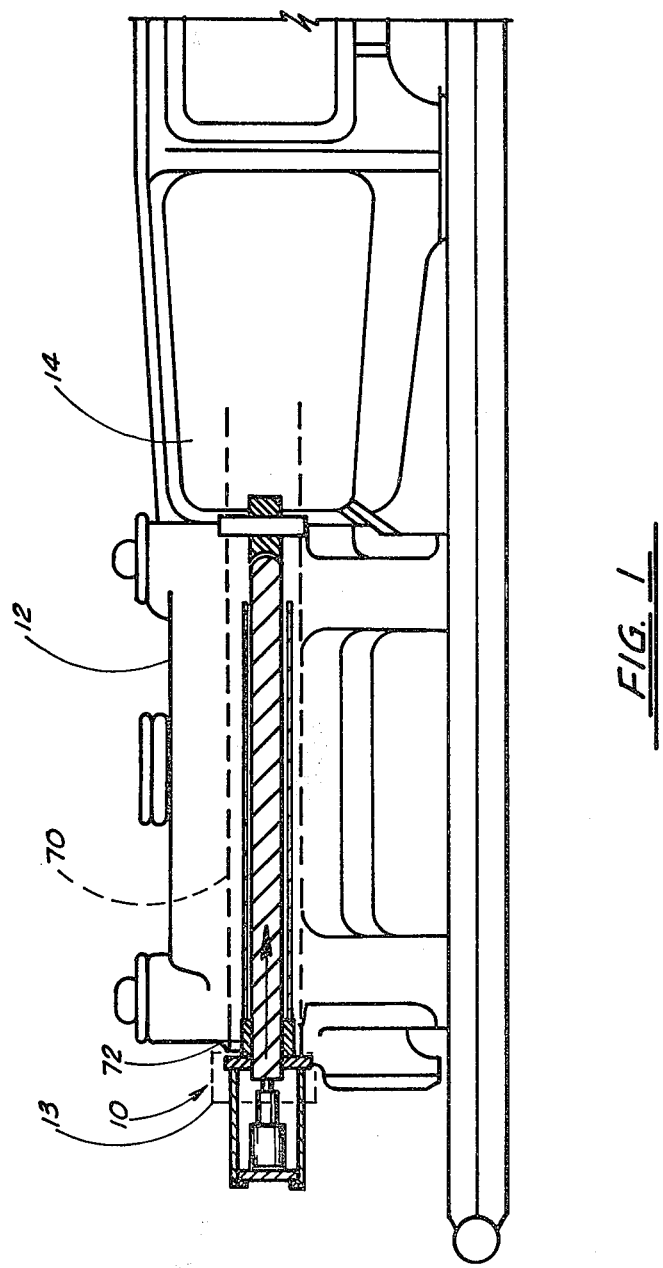

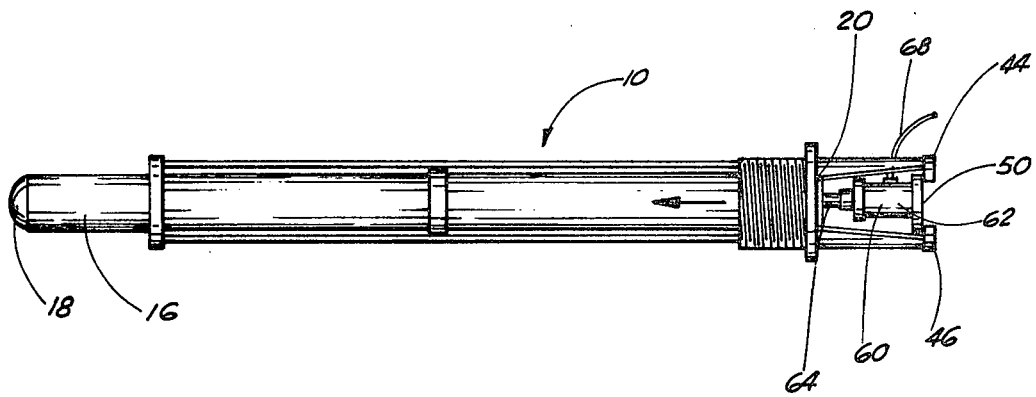
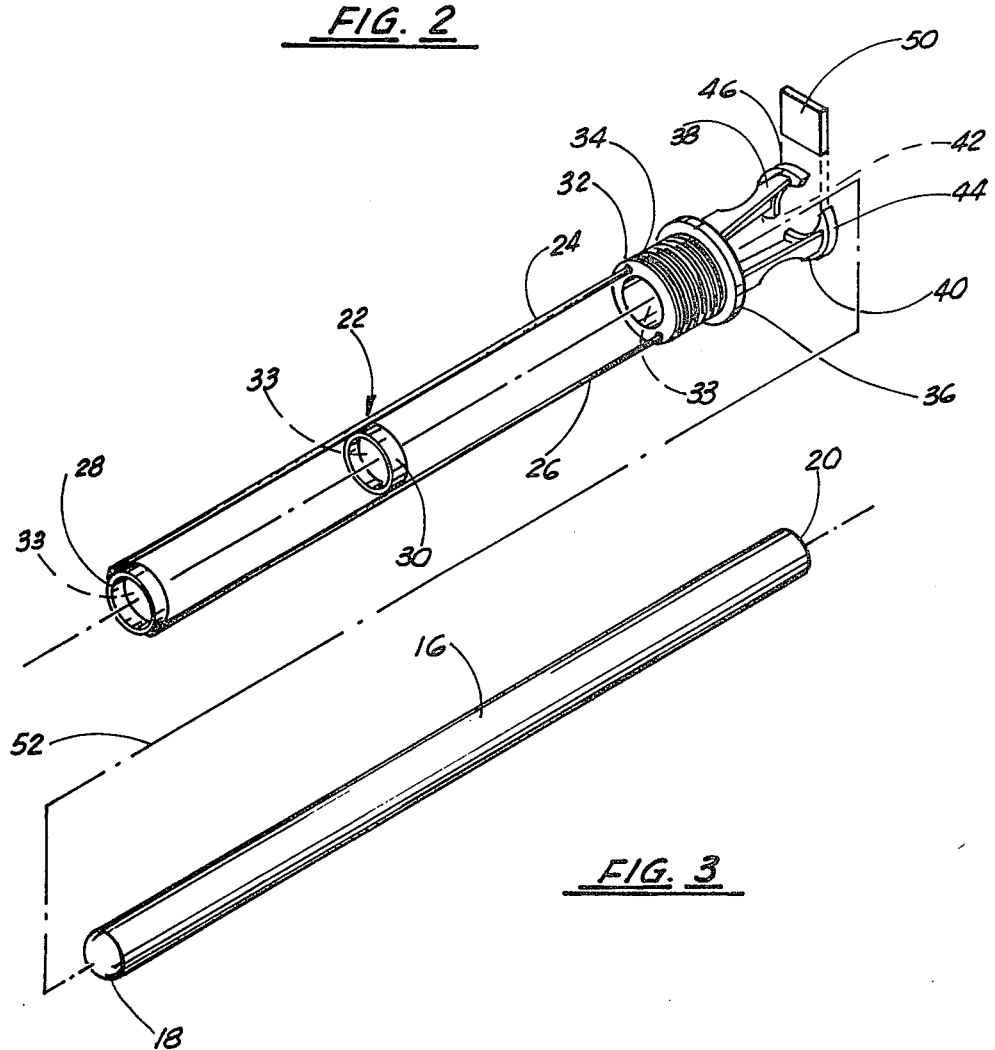

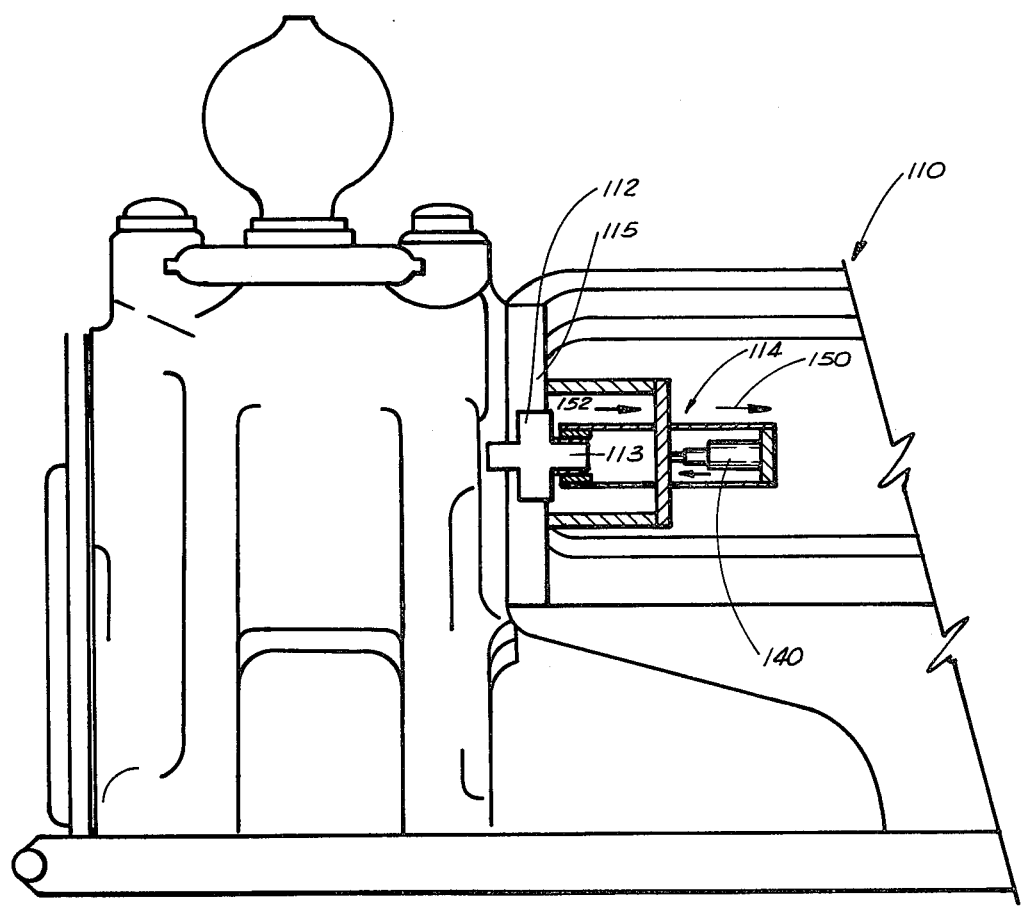
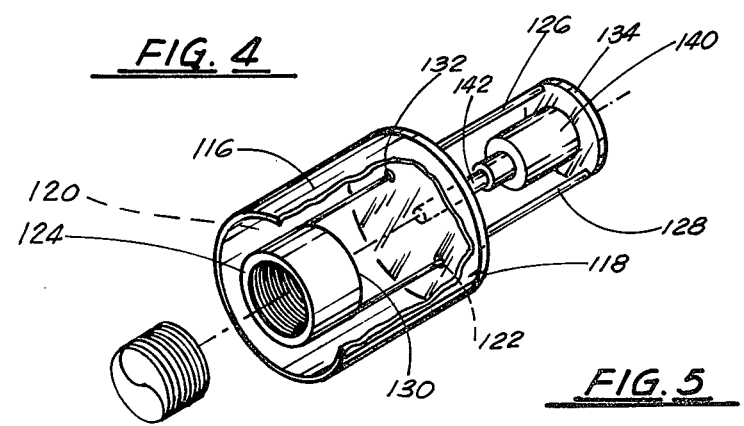
FIG. 4
FIG. 5

STUFFING BOX REMOVAL APPARATUS

BACKGROUND OF THE INVENTION

1. Field of the invention

The preferred embodiment of the present invention relates to apparatuses for removing parts of packing materials surrounding motors. More particularly, the present invention relates to an apparatus for removing the stuffing box located on a piston operated downhole pump.

2. General Background

In the oil and gas industry, to facilitate the drilling of an oil well onshore or beneath the floor of a body of water, during the actual drilling of the hole, hollow sections of drill pipe are threadably connected end to end to produce the "drill string" as the hole is drilled, with the drill bit attached on the lowermost part of the drill string. The entire drill string is rotated as it is moved down the hole, and the drilling takes place in that manner. Normally for the first 10 to 20 thousand feet, casing pipe is pushed down the hole, which is a larger diameter pipe, through which the drill string circulates. This casing pipe is usually cemented within the hole, and while serving as a guide for the drill string, also prevents the drill string to be obstructed by breaking of rock formations or the like down within the hole, and maintains a clear path for the drill string.

In order to wash the drill hole out as the hole is being drilled, various types and weights of drilling mud are pumped down the drill string to be exited the drill string at the head of the bit. In doing this, the bit is continuously lubricated, maintained relatively cool, and the mud also serves as it is weighted down the hole, to help reduce the likelihood of a blow-out, and keep the equilibrium within the hole between the pressure exerted upward by possible oil or gas struck by the bit, and therefore, prevent the well from blowing.

This mud is constantly circulated down the drill hole and returned up out of the hole to be cleansed and filtered and recirculated back down the hole. This drilling mud, as stated earlier, is of various weights, and is a very expensive product for maintaining on the drill site.

In order to properly move the mud through the hole and up again, a rig pump is utilized which is basically a piston operated pump for pressurizing the mud down the hole as it is run through the pump. These pumps are in operation on a constant basis during the drilling process, and due to their constant operation, often times produce great amounts of heat during the drilling process. In order to maintain the piston relatively cool and the pump on a operational basis, a "stuffing box" surrounds the pump head, which is a type of an insulation means for maintaining the pump at a constance temperature and attempting to prevent overheating of the pump.

When, during the drilling process, the pump, at the pump head, springs a leak, or a crack occurs in the head, the valuable mud or fluid being pumped by the pump, will eventually seep into the stuffing box, and loss of mud or the like fluid will occur. Therefore, the stuffing box must be removed from the head of the pump, and the pump repaired or the head changed in order to properly maintain the flow of mud down the hole.

In the present state of the art, what now occurs on the rig at the time, is that the piston contained within the cylinder of the pump is removed manually, and a large production pipe or the like is slipped within the cylinder manually by several rig workers. The pipe or the like is then moved swiftly backwards and forward in a "battering ram" type of fashion until such time as the stuffing box is dislodged from around the pump head. This rather primitive manner of removing the stuffing box from the head of the pump is very time consuming, often taking 6 to 12 hours of round the clock of battering by workers on the rig, in order to remove the stuffing box. This loss in time also means loss in rig time due to the breakdown of the pump, loss in manpower time due to the shifting of men from their present work stations to the pump in order to work on removing the stuffing box, and overall breakdown of the function of the rig during this extended process.

GENERAL DISCUSSION OF THE PRESENT INVENTION

The preferred embodiment of the present invention would solve the prior art problems and shortcomings in a simple and inexpensive straight forward manner. The present invention would provide for a guide means which would be a frame insertible into the cylinder of the pump, and threadably engagable into the cylinder head for positioning there into. Subsequent, an elongated ram means would be positioned within the retaining rings along the length of the guide, with the far end of the ram means in position against the stuffing box. There is further provided a plate or the like positioned adjacent to the near end of the ram means, with a space there between the plate and the near end of the pipe. Positioned in that space would be a hydraulic jack or the like, which when activated, would place pressure on the near end of the ram means, and thus move the ram means in toward the stuffing box. This constant pressure of the hydraulic jack on the ram means, would hydraulically force the stuffing box off from its position on the pump head, and thus achieve easy removal of the stuffing box.

Therefore, it is an object of the preferred embodiment of the present invention to provide a simple and inexpensive apparatus for removing the stuffing box from the head of a down hole pump.

It is another object of the present invention to provide an apparatus which removes the stuffing box from the down hole pump in a significantly less amount of time than under the present state of the art.

It is yet another object of the present invention to provide an apparatus for removing the stuffing box from the head of a down hole pump, by the use of a hydraulically maintained force against the stuffing box itself.

In order to achieve the above objects of the present invention it is a feature of the present invention to provide a guide means for inserting into the cylinder of a down hole pump for positioning of a ram there within.

It is still another feature of the present invention to provide an apparatus for removing the stuffing box around the down hole pump, by positioning a ram within the cylinder of the pump itself, and hydraulically forcing the ram along a guide means for removal of the stuffing box.

BRIEF DESCRIPTION OF THE DRAWINGS

FIG. 1 is a side partial cut away view of the preferred embodiment of the present invention mounted within the cylinder of a down hole pump.

FIG. 2 is a side view of the assembled apparatus of the present invention, and FIG. 3 is a perspective view of the diassembled apparatus of the preferred embodiment of the present invention.

FIG. 3 is a perspective view of the apparatus shown in FIG. 2 in a disassembled position.

FIG. 4 is a side partial cut away view of an alternative embodiment of the present invention mounted within a down hole mud pump.

FIG. 5 is a perspective cut away view of the alternative embodiment of the present invention.

DETAILED DESCRIPTION OF THE DRAWINGS

FIGS. 1 through 3 best illustrate the preferred embodiment of the apparatus of the present invention generally designated by the numeral 10. FIG. 1 further illustrates apparatus 10 as it is mounted in relation to rig pump 12. Rig pump 12 is a typical on board rig pump, a function of which is to maintain the flow of mud through the hole during the drilling process, by having the mud being forced down the hole via a piston or the like means mounted normally where apparatus 10 is presently mounted.

Because often times there is a leak which occurs within the pump 12, the stuffing box 14 which is an insulation or the like contained around the head of the pump, must be removed in order to properly repair the leak.

FIGS. 2 and 3 illustrate the preferred embodiment of apparatus 10 which is the subject of the present application for removing stuffing box 14 from pump 12 once a leak has occurred. Apparatus 10 comprises ram member 16 which is a hollow core aluminum member being of specific length normally 6 to 8 feet in length of sufficient thickness to maintain a rigid ram member during the removal process. Ram member is provided with intergrally connected bullnose end 18 which is a rounded end or the like which would be that end of the apparatus in contact with the stuffing box 14 itself. Opposite bullnoze portion 18 would be second end portion 20 which is a flat end portion, the function of which will be described further. Therefore, basically, ram 16 is an intergral hollow cylindrical means with a closed first and second ends 18 and 20, respectively. Further illustrated in FIG. 3, is ram guide means 22 which comprises a pair of rods or the like 24 and 26 which are metal rods extending substantially the length of guide means 22. Rods 24 and 26 are maintained in generally parallel relation via first ring member 28 located at the first end of guide member, and having a bore there through for receiving ram 16, and second ring member 30 which is located approximately half way down the length of rods 24 and 26, which is also substantially a hollow ring, with a bore there through for also receiving ram 16 there through. At the second end, rods 24 and 26 are intergrally attached to threaded sleeve 32 which is a cylindrical sleeve coaxially aligned with ring members 28 and 30, sleeve 32 also having a bore 33 there through for receiving ram 16. In the preferred embodiment, cylindrical sleeve 32 is a substantially thickened sleeve, intergrally connected via welding or the like to the end portions of rods 24 and 26, and having threads 34 along its exterior, for threadably engaging the interior threading of the head of the pump cylinder, as seen in FIG. 1, during the operation of the apparatus.

Threaded sleeve 32 further comprises a shoulder or the like portion 36 which extends out from sleeve 34 and serves as an annular shoulder means intergrally connected to the outermost postion of threaded sleeve 32. This annular shoulder portion 36 serves as a mounting plate for housing means 38 and 40, which comprise a pair of rearward extending semi-annular plates, having opening 42 there between, the opening of which will be explained further. Rearward extending plates 38 and 40 have mounted rearward to their end portions semi-circular plates 44 and 46, the function of which will be explained further. Also illustrated is plate 50 which is a thickened steel or the like plate, which is insertible in opening 42, and maintained in position against plates 44 and 46 during the operations of apparatus 10, as can be seen in FIG. 2.

FIG. 2 illustrated in the preferred embodiment the positioning of the various components of apparatus 10 during the functioning of the apparatus. As is illustrated, ram portion 16 has been inserted through opening 42, as illustrated by broken line 52 in FIG. 3, further through bore 33 of sleeve 34, and further through bore 33 of collar 30 and bore 33 of collar 28, with bullnose portion 18 extending outward from the guide frame 22 as illustrated in FIG. 2. As is further illustrated in FIG. 2, the flat end portion 20 of ram 16, while mounted in frame 22, is flush with annular shoulder portion 36. Following the positioning of ram 16 within frame 22, hydraulic jack 60 is slipped through opening 42, with the body portion 62 of jack 60 mounted against plate 50 following the positioning of plate 50 proximate semi-annular walls 44 and 46. Hydraulic jack 60, would have its cylinder 64 in position against end portion 20 of ram 16 in readiness of function of apparatus 10. Also illustrated in FIG. 2 is hydraulic line 68 which, of course, would supply hydraulic jack 60 with fluid for operation of jack 60.

FIG. 1 illustrates more clearly the positioning of apparatus 10 during the actual operation of apparatus 10. As stated earlier, there is provided rig pump 12, having stuffing box 14, the object of the apparatus to be the removal of stuffing box 14. In FIG. 1 there is seen pump 12, with the head 13, as illustrated in phantom, having been removed from pump 12, thereby providing a substantially cylindrical space 70 running along the length of pump 12, which would normally be occupied by the movement of the piston within pump 12 during the pumping process. In place of the piston, apparatus frame 22 would be inserted there into space 70, and threaded cylindrical sleeve 32 would be threadably engaged at point 72 with the internal threads of pump 12, for mounting of frame 22 there into. As can be seen in FIG. 1, cylindrical shoulder portion 36 would be in rigid contact with the end portion of pump 12 after mounting frame 22 has been mounted there within. Following the mounting process, ram 16 would therefore be slided into frame 22, as is illustrated in FIGS. 2 and 3, and once in position, the bullnose 18 of ram 16 would be in contact with stuffing box 14. Hydraulic jack 60, would then be mounted as described earlier, and would be pressurized for movement of hydraulic piston outward. Since body portion 62 of hydraulic jack 60 is in immovable position against plate member 50, ram 16 would be forced by hydraulic jack piston 64 in the direction of the stuffing box, and the force of hydraulic jack 60 would ultimately force the removal of stuffing box 14 from pump 12. The process involved would create a constant force upon stuffing box 14 rather than the battering effect in the present state of the art, and would in effect overcome the ability of stuffing box 14 to be maintained in rigid contact with pump 12 and thus would be forceably removed therefrom. Of course, following the dislodging of stuffing box 14, hydraulic jack 16 would be retreived, along with ram 16 and frame 22 would be threadably disengaged and pump 12 could be reassembled following the repairing of the leak, and the replacement of the stuffing box there upon.

An additional embodiment of the apparatus as detailed in this section would be seen in FIGS. 4 and 5. In FIG. 4 there is seen pump apparatus 110 which, also, is a typical downhole mud pump or the like located on the drilling rig, the function of which has been discussed earlier. Pump 110 would likewise have a stuffing box 112 which, as in the previously described embodiment, would also, due to problems with the stuffing box, require replacement from time to time. In order to accomplish this replacement, the additional embodiment of stuffing box removal apparatus 114 is illustrated in cutaway side view in FIG. 4 and in perspective cutaway view in FIG. 5. In FIGS. 4 and 5 apparatus 114 comrpises annular mounting frame 116 which is a continuous annular side wall mounting ring having an intergrally attached back wall 118 and an open ended 120. Mounting ring 116 would be a rigidly constructed metal frame, the annular wall 116 having the ability to withstand pressures against it. A pair of bores 132 and 122 are provided in the rear end portion, the function of which will be discussed further.

Apparatus 114 further comprises annular threaded collar portion 124 which is a annular collar which would fit within the opening 120 of annular mounting means 116, and would be of significantly less diameter than annular mounting means 116. Annular collar 124 would be further provided with a pair of guide members 126 and 128 which would extend from the inner end portion 130 of annular collar 124, and would extend rearward through bores 132 and 122 respectively, guide members 126 and 128 being of less diameter than bores 132 and 122, thus having free movement in either direction along the length of guide members 126 and 128. At the second end of guide bars 126 and 128 there would be mounting plate 134 which would be a thickened metal plate rigidly attached by welding or the like to the ends of bars 126 and 128, for defining a rigidly attached base portion, the function of which will be discussed further.

Further illustrated in FIGS. 4 and 5 is hydraulic jack 140 which is a removable jack and is positioned in FIGS. 4 and 5 as shown in the operation of apparatus 114, with the base of jack 140 secure against the inner face portion of plate 134, and the piston 142 of jack 140 in contact with the outer face portion of rear base portion 118 of annular mounting means 116.

In operation, as is illustrated in FIG. 4, and side view, threaded annular collar 124 would be threadably attached to the outer most end portion 113 of stuffing box 112, which, typically, would be a threaded noze portion extending out from pump 110, which would normally have a cap or the like threaded on to end portion 113 for sealing stuffing box 112. In the use of the apparatus, end portion 113 would have the cap portion removed, and, as stated earlier, annular collar 124 would be threadably engaged to end portion 113. Upon threadably engaging end portion 113, mounting means 116 would be in position against the wall 115 of pump 110, and would serve as a means to act as a counter force against the piston 142 of jack 140 during the removal process. Once the apparatus has been installed as stated earlier, jack 140 would be placed in position with the base portion in contact with plate 134, and the piston portion 142 in movable relation so that contact is made with base 118 of annular mounting means 116. Of course, upon extension forward of piston 142, the movable portion constructed of the guide members 126 and 128 and annular collar 124 would be forced to retract as indicated by arrow 150. This retraction would in effect require the stuffing box, which is threadably engaged to collar 124 to be retracted also in the direction of arrow 152 and thus, would be removed in the process.

Of course, upon removal of stuffing box 112, the stuffing box is threadably disengaged from collar 124, and a new stuffing box is placed into position on pump 110 for reusing of pump 110.

Because many varying and different embodiments may be made within the scope of the invention concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for removing stuffing box from a downhole mud pump, which comprises:
   a. an elongated guide means adapted to be inserted into said pump in lieu of a pump piston, said guide means having a bore therethrough for insertion of a ram there into;
   b. a ram means, insertible along substantially the entire length of said guide means, which hold said ram means in coaxial relation to said bore along its entire length;
   c. a cylindrical hollow mounting means coaxially fixedly attached to said guide means at one end thereof, said mounting means being adapted to fixedly engage an end portion of said pump at a point of attachment of the pump head to said pump;
   d. a rearward mounting means connected to said last mentioned mounting means and extending outwardly from said pump and having an annular bore substantially through its entire length, said annular bore coaxially communicating with said bore of said guide means, said annular bore including means to receive a hydraulic pressure means to move said ram means laterally outwardly from said guide means in forceable contact with the stuffing box to be removed.

2. The apparatus in claim 1, wherein said guide means further comprises at least two retainer rings having coaxial bores, along its length for receiving said ram through said rings.

3. The apparatus of claim 1, wherein said rearward mounting means are provided with means to prevent lateral movement of a hydraulic jack of said hydraulic pressure means outward from said pump direction.

4. The apparatus of claim 1, wherein said cylindrical mounting means is provided with a collar means adapted to be positioned immediately adjacent said point of attachement of said pump head to said pump, said collar means having a diameter greater than that of said cylindrical mounting means and a piston receiving opening of said pump.

* * * * *